United States Patent Office 2,846,332
Patented Aug. 5, 1958

2,846,332

DISPERSIONS OF SOLIDS IN CAPROLACTAM AND PROCESS OF MAKING THEM

Glenn A. Nesty, Morristown, N. J., assignor to Allied Chemical Corporation, New York, N. Y., a corporation of New York No Drawing. Application July 20, 1955
Serial No. 523,364

6 Claims. (Cl. 106—308)

This invention relates to a novel composition of matter comprising a dispersion of a finely divided solid in epsilon-caprolactam, having the formula:

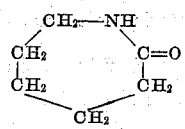

hereinafter referred to simply as "caprolactam." By a finely divided solid I mean one which is too fine to be held on a 325 mesh sieve; in terms of particle diameters, the constituent particles of a finely divided solid in the sense here meant have diameters no greater than about 40 microns.

Dispersions of finely divided solids in oils and the like at relatively high solids content, such as 5%–95% by weight, are broadly known, and have been used for many purposes, e. g. for incorporation in paints, lacquers, varnishes or inks as pigments or fillers; to provide a white pigment or filler for rubber goods; to provide an opacifier for paper; to provide an opacifier for plastics; in processing leather; etc.

I have now discovered that epsilon-caprolactam is a very effective dispersing medium for finely divided solids, at temperatures above its fusion point, which can be lowered by presence of a soluble impurity such as water, etc., if desired. Both hydrophilic and hydrophobic finely divided solids can be dispersed in caprolactam. Moreover, caprolactam is itself compatible with a very wide range of other liquids so that a dispersion of relatively high solids concentration in caprolactam can be used very generally as a master mix for incorporating the solid as a dispersion in a body of material. It is especially useful to pigment or deluster melt spun filaments, as will be demonstrated below.

More particularly, my dispersions of finely divided solid in caprolactam contain above 5 parts by weight of finely divided solid per 100 parts by weight of lactam. Higher concentrations are advantageous to cut down on the lactam carrier; but for some purposes the dispersion should contain at least enough lactam to be pourable at elevated temperatures. My dispersions contain substantially no particles or agglomerates of particles of diameter greater than about 10 microns. Preferred dispersions in accordance with my invention contain a finely divided solid of mean particle diameter not above about 1 micron.

My dispersions can be obtained by milling a mixture of caprolactam and solid at concentrations of solid and at temperatures at which a suitable viscosity is obtained for use with the particular apparatus. Suitable apparatus includes roll mills as for paint; ball mills; and colloid mills operating to apply shearing forces. Even circulation of the mixtures through a centrifugal pump produces dispersions which are satisfactory for many purposes.

The following examples are illustrative of my invention but the invention is not to be considered as limited to the details of these examples. Pigment grade titanium dioxide employed in the examples as the finely divided solid is representative of a wide variety of materials, inorganic and organic, which can be similarly dispersed in caprolactam; these materials having the common properties of being finely divided and having relatively low solubilities in caprolactam.

*Example 1*

Type AMO hydrophobic titanium dioxide (a pigment grade titanium dioxide of anatase crystal structure) of mean particle diameter about 0.3 micron was employed as a paste of 43% titanium dioxide in water. This paste, 1745 parts, together with 12825 parts of substantially pure caprolactam and 430 parts of water was circulated through a centrifugal pump for 15 minutes at 50° C. There was thus obtained an apparently homogeneous, pourable, fine dispersion of about 5.8 parts of titanium dioxide per 100 parts of lactam.

This dispersion was added to a stirred melt of polycaprolactam. The polymer obtained was melt spun to a delustered filament of elongation 31% at break and tensile strength 5.85 grams per denier at break. These properties of the spun filament indicate that the lactam dispersion had good dispersibility in the polymer and that there were substantially no particles or agglomerates of diameter greater than about 10 microns in the dispersion.

*Example 2*

A mixture of 810 parts epsilon-caprolactam, 95 parts water, and 95 parts titanium dioxide was made and was circulated for 30 minutes in a colloid mill with procedure similar to that of Example 1.

The resulting apparently homogeneous, pourable, fine dispersion was added during 20 minutes to caprolactam undergoing polymerization with stirring in the melt at about 215°–220° C., to give about 0.7% titanium dioxide in the polycaprolactam. The final polymer was melt spun to a satisfactory delustered filament, indicating good dispersibility of the lactam dispersion in the larger body and freedom of the dispersion in lactam from particles or agglomerates of diameter greater than about 10 microns. Probably substantially all particles and agglomerates were below 2 microns in diameter.

Dispersions in accordance with my invention which are substantially free from agglomerates can be prepared by working the mixtures of lactam and finely divided solid as a viscous or doughy mass and periodically heating the mass until it becomes appreciably more fluid, as disclosed and claimed in the copending application of Forrest J. Rahl, filed simultaneously herewith.

The epsilon-caprolactam present in my dispersions can contain diluents, freezing point depressants, etc. Because impurities can cause flocculation of some finely divided solids with resulting formation of agglomerates, I prefer to use at least about 85% pure caprolactam as the continuous phase in my dispersions.

My finished caprolactam dispersions can be used as master mixes not only in liquid form above their fusion points, but also can be cooled quickly, e. g. by pouring out into a cold non-solvent or onto a cold surface and used in solidified form, e. g. in flake, pellet or especially in powder form; and especially under conditions of quick heating up and liquefying or quick dissolving in the main body to which the master mix is added.

Other materials are useful in my invention, alone or in admixtures, like titanium dioxide of the above examples. They are characterized by having limited, preferably relatively low, solubility in epsilon-caprolactam and by being obtainable in finely divided form. Among these materials are conventional pigments, fillers, delusterants, etc., both inorganic and organic. Specific examples of inorganic delusterants or fillers useful in my invention are calcium hydroxide, calcium phosphate, barium titanate, zinc titanate, magnesium titanate, calcium titanate, zinc oxide, zinc sulfide, lithopone, zirconium dioxide, calcium sulfate, barium sulfate, aluminum oxide, thorium oxide, magnesium oxide, silicon dioxide, talc, mica, and the like. Examples of inorganic pigments or fillers which can be used are carbon black, lead chromate, iron oxide and chromium oxide.

Metal salts of organic acids are examples of organic compounds of relatively low solubility in caprolactam which can be used for the purposes of my invention. Specific examples of useful compounds include sodium adipate, barium adipate, calcium adipate, aluminum adipate, cadmium adipate, lead adipate, copper adipate, silver adiate, lead formate, calcium glutarate, calcium oxalate, the lead salt of N-phenyl phthalamic acid, the barium salt of benzyl-para-aminobenzoic acid, and the calcium salt of benzyl-para-aminobenzoic acid.

I claim:

1. A composition of matter consisting essentially of epsilon-caprolactam and above 5 parts by weight of finely divided solid of the group consisting of pigments, fillers and delustrants per 100 parts by weight of caprolactam, said solid being dispersed in caprolactam with substantially no particle agglomerates of diameter greater than about 10 microns.

2. A composition of matter as defined in claim 1 in which the particles of finely divided solid have mean diameter not above about 1 micron.

3. A composition of matter as defined in claim 2, wherein pigment grade titanium dioxide is the finely divided solid; the continuous phase is at least about 85% caprolactam; and the amount of lactam present produces a pourable dispersion at elevated temperatures.

4. Process for incorporating finely divided solid particles in polycaprolactam which comprises forming a master mix by colloidally dispersing solid particles of the group consisting of pigments, fillers and delustrants in fused epsilon-caprolactam at concentration above 5 parts by weight of solid per 100 parts by weight of caprolactam until substantially no particle agglomerates having diameter greater than about 10 microns remain in the caprolactam dispersing medium; then incorporating the resulting composition in a stirred melt of polycaprolactam.

5. Process as defined in claim 4 wherein the continuous phase in the master mix is at least about 85% caprolactam.

6. Process as defined in claim 5 wherein the finely divided solid is pigment grade hydrophobic titanium dioxide of mean particle diameter about 0.3 micron.

References Cited in the file of this patent
UNITED STATES PATENTS

| | | |
|---|---|---|
| 2,000,003 | Verbyla | Apr. 30, 1935 |
| 2,345,533 | Graves | Mar. 28, 1944 |
| 2,405,969 | Martin | Aug. 20, 1946 |
| 2,457,591 | Moore | Dec. 28, 1948 |
| 2,550,363 | Luten | Apr. 24, 1951 |